(12) United States Patent
D'Agostino et al.

(10) Patent No.: US 10,620,322 B2
(45) Date of Patent: Apr. 14, 2020

(54) SYSTEM AND METHODS FOR DISTRIBUTED DOSIMETRY ON A SINGLE LIGHT GUIDE

(71) Applicant: DOSEVUE NV, Diepenbeek (BE)

(72) Inventors: Emiliano D'Agostino, Mol (BE); Jeroen Hermans, Leuven (BE)

(73) Assignee: DOSEVUE NV, Diepenbeek (BE)

( * ) Notice: Subject to any disclaimer, the term of this patent is extended or adjusted under 35 U.S.C. 154(b) by 185 days.

(21) Appl. No.: 15/525,441

(22) PCT Filed: Nov. 10, 2015

(86) PCT No.: PCT/EP2015/076275
§ 371 (c)(1),
(2) Date: May 9, 2017

(87) PCT Pub. No.: WO2016/075180
PCT Pub. Date: May 19, 2016

(65) Prior Publication Data
US 2017/0322317 A1    Nov. 9, 2017

(30) Foreign Application Priority Data
Nov. 10, 2014  (GB) .................................. 1420005.9

(51) Int. Cl.
*G01T 1/161*   (2006.01)
*G01T 1/20*    (2006.01)

(52) U.S. Cl.
CPC .............. *G01T 1/161* (2013.01); *G01T 1/201* (2013.01)

(58) Field of Classification Search
CPC .................. G01T 1/161; G01T 1/201
See application file for complete search history.

(56) References Cited

U.S. PATENT DOCUMENTS 4,788,436 A * 11/1988 Koechner ............... G01T 1/201
                                                        250/227.23
5,168,540 A * 12/1992 Winn ..................... G01T 1/201
                                                        385/128
(Continued)

FOREIGN PATENT DOCUMENTS

WO      02065891 A2    8/2002
WO    2012159201 A1   11/2012
(Continued)

OTHER PUBLICATIONS

Great Britain Search Report for corresponding Great Britain Application No. 1420005.9, dated Jun. 4, 2015.
(Continued)

*Primary Examiner* — Chih-Cheng Kao
(74) *Attorney, Agent, or Firm* — Workman Nydegger (57) ABSTRACT

A system and method for measuring a dose of ionizing radiation received by a pre-determined part of the body during radiotherapy or interventional procedures. The system comprises: a) a light guide, which under the influence of ionizing radiation undergoes measurable and quantifiable physical changes; b) a detector system which allows the recording and quantification of the signal emitted by the light guide; and c) a control unit which is adapted for calculating a dose of ionizing radiation previously or simultaneously received by the light guide on basis of said response signal. The light guide is coated over at least part of its length with a coating comprising a first component acting as a place dependent spectral filter and a second component including at least one luminescent material, dispersed in a transparent matrix. When exposed to radiation, the luminescent component will emit light with a spectrum depending on the chosen material.

15 Claims, 2 Drawing Sheets

(56) References Cited

U.S. PATENT DOCUMENTS

| | | | |
|---|---|---|---|
| 5,313,065 A | 5/1994 | Reed | |
| 5,331,961 A | 7/1994 | Inaba et al. | |
| 5,334,839 A * | 8/1994 | Anderson | G01T 1/201 250/366 |
| 5,811,814 A | 9/1998 | Leone et al. | |
| 6,782,289 B1 | 8/2004 | Strauss | |
| 2002/0087079 A1 | 7/2002 | Kaufman et al. | |
| 2006/0045238 A1 * | 3/2006 | Nguyen | A61N 5/103 378/65 |
| 2006/0153341 A1 | 7/2006 | Guyonnet et al. | |
| 2009/0236510 A1 | 9/2009 | Lacroix et al. | |
| 2014/0263991 A1 | 9/2014 | Therriault-Proulx et al. | |
| 2014/0357988 A1 * | 12/2014 | Grass | G01T 1/161 600/424 |

FOREIGN PATENT DOCUMENTS

| | | |
|---|---|---|
| WO | 2013040646 A1 | 3/2013 |
| WO | 2013068877 A2 | 5/2013 |
| WO | 2014039765 A1 | 3/2014 |

OTHER PUBLICATIONS

"How Can Radiation Therapy Cause Heart Disease?" The Economist, Aug. 1, 2013, pp. 2, http://www.economist.com/blogs/economist-explains/2013/07/economist-explains-22.

International Search Report for corresponding International PCT Application No. PCT/EP2015/076275, dated Feb. 2, 2016.

Vano et al., "Implications in Medical Imaging of the New ICRP Thresholds for Tissue Reactions," presented at the International Commission on Radiological Protection Symposium, Oct. 22, 2013, pp. 1-15, Abu Dhabi.

Yusuf et al., "Radiation-Induced Heart Disease: A Clinical Update," Cardiology Research and Practice, Dec. 15, 2010, pp. 1-9, vol. 2011.

* cited by examiner

SYSTEM AND METHODS FOR DISTRIBUTED DOSIMETRY ON A SINGLE LIGHT GUIDE

FIELD OF THE INVENTION

The invention relates to systems and methods to perform distributed radiation dosimetry using spatial encoding of a light signal generated by radiation and captured by a probe along a single light guide, so that the position and the intensity of the signal along the light guide can be determined.

BACKGROUND OF THE INVENTION

Light guides, and more specifically optical fibers, can conveniently be used for remote sensing. Currently, there are a number of applications where optical fibers are used for single point or distributed sensing, in order to monitor temperature and/or pressure in a given environment, using for instance Fiber Bragg Grating (FBG) technology.

In particular, in the medical field, optical fibers are also used since years, at least at an investigational level, for in-vivo radiation monitoring, in different fields, such as radiation therapy and nuclear medicine. In these domains, the fibers are used, possibly in combination with a radiation detector, in order to guide the light generated by the exposure to ionizing radiation, to an external reader.

As a specific example of medical dose monitoring, the fields of interventional procedures and of brachytherapy are discussed hereinafter.

Interventional procedures in cardiology are widely used, as a minimally invasive alternative to surgical interventions. The entire procedure is based on the (intensive) use of fluoroscopic imaging in order to follow the patient's anatomy in real-time and to visualize the position of catheters and other tools during insertion. However, imaging with X-rays does also imply exposure of patients (and staff) to ionizing radiation. Particularly in complex procedures, the doses absorbed by different organs can be quite high.

In a recent study performed by E. Vano (*Implications for medical imaging of the new ICRP thresholds for tissue reactions*, presented at the International Commission on Radiological Protection symposium, 22 Oct. 2013, Abu Dhabi), where 4128 patients were included, it is shown that in a period included between 2010 and 2011, 16% to 27% of the patients undergoing a cardiac interventional procedure at the San Carlos university hospital in Madrid, were exposed to a cardiac radiation dose of at least 500 mGy and to a lung dose of at least 1000 mGy. As a comparison, 0.1 mGy is the dose associated with an X-ray lung radiography and 2000 mGy is the typical dose imparted to a tumour daily, in radiation therapy.

In recent studies it has been shown that exposure of the heart to ionizing radiation, severely increases the risk of heart failure and that there are a number of cardiac pathologies that are strictly linked to radiation exposure (S. W. Yusuf et al., Radiation-Induced Heart Disease: A Clinical Update, *Cardiology Research and Practice*, 2011). Because of the societal impact of this problem, these results were also commented by the Economist in an article of Jul. 13, 2013 entitled *How can radiation therapy cause heart disease?*

Shortly, systematic dose monitoring will give the following advantages:

Provide an accurate measurement of the radiation dose delivered to the patient during cardiology interventional procedures.

Empowerment of patients by giving them real, measured radiation doses, instead of estimations. Therefore potential risks can be correctly understood and anticipated.

Quality label for cath labs: lower dose for the same interventions will be associated with higher healthcare quality standards.

Operator awareness: a dose measurement device will be an additional tool for cardiologists to monitor their performances.

On the therapy side, High Dose Rate, HDR, brachytherapy is used as an effective treatment in a select group of breast cancer patients. Whereas in "classical" radiation therapy, patients are irradiated over 6 to 7 weeks, 5 days a week, in HDR brachytherapy, a higher dose is typically imparted per fraction (5 Gy instead of 2 Gy) so that a total of 10 fractions over 5 days (patients are irradiated twice a day) completes the entire treatment.

In breast HDR brachytherapy, the dose is delivered through the insertion in the tumour of a number of radioactive Ir-192 sources. The kinematic of these sources (i.e. their position as a function of time), along with their activity, define completely the final dose distribution in the tumour and in the surrounding healthy breast tissue.

The expected dose is calculated by a software (treatment planning system) that makes a number of approximations on the actual patient anatomy.

Nowadays there is no commercially available system allowing an in-vivo, real-time dose measurement at several points, in a convenient, user-friendly and possibly economical way, so that it can be easily and systematically integrated within a clinical workflow. It would be an advantage to have a system available that would allow measuring the imparted dose, at different locations, in a minimally invasive way.

In WO2012159201A1, systems and methods are described to perform dosimetric measurements using a plurality of scintillating elements, on one optical fiber. These elements may be contiguous or located at a certain distance from each other. Different kind of scintillating materials can be used. Alternatively, the same material can be used for all elements. In this case band-pass filters have to be glued, between each pair of scintillating elements.

The response of the different scintillators is obtained by deconvolving the total spectrum, using signal processing tools. The actual number of scintillators admitted on the fiber is limited by the fact that their spectra have to differ, at least in part, in order to be able to separate the contribution coming from each of them. In other words, the actual spatial resolution that they can achieve, is limited by the dimensions of the scintillators used and by their number (the latter being limited by the fact that the spectra of the different scintillators should differ and by the overall mechanical robustness of the system). When using the same material for all scintillating elements on the fiber, spatial resolution can be lost by the fact that a band-pass filter is needed in between the different scintillators. Furthermore, the overall mechanical stability of the fiber may be compromised when gluing (contiguously or non-contiguously) many scintillators and/or filters on it.

In U.S. Pat. No. 6,782,289, system and methods are presented to perform dose measurement in a body's blood vessels, after having injected a radioactive marker. This marker will eventually accumulate on plaques in the arteries and their radioactivity is measured by the system presented. More specifically the system disclosed in U.S. Pat. No. 6,782,289 can only measure scintillation coming from one region (the plaque loaded with radioactive tracer). In this case, a single detector is fixed at one position on the fiber.

In US20020087079A1 a system is described wherein a scintillator is integrated in a catheter, and optical guides are used to bring the light produced from the scintillator to the reader. This system is only capable of measuring a dose at one location, in correspondence with the scintillating element.

In U.S. Pat. No. 5,811,814A, yet another system is illustrated, wherein a single scintillating element, along with an optical fiber, are incorporated in an intravascular catheter. Also this system, as some of the ones previously discussed, is able to measure a dose only at one location.

In US20060153341A1 and US20090236510A1 systems are presented, allowing multi-point radiation detection. However, according to both descriptions, the use of a plurality of light guides is needed to collect the light produced at the different points.

SUMMARY OF THE INVENTION

It is an object of embodiments of the present invention to provide a good dosimetric system and method, allowing to measure a radiation does received by a patient, in real-time.

A dosimetric system according to embodiments of the present invention includes an innovative smart dosimetric probe, including a light guide for distributed dose measurement along the light guide. The light signal is emitted by one or more luminescent materials coating the light guide over a given length.

Although the methods and systems disclosed in the prior art provide useful solutions in certain situations for performing in-vivo dosimetry, to our knowledge, there exists no commercial system that allows a spatially distributed measurement of radiation dose, using a single light guide.

The above objective is accomplished by embodiments of the present invention.

In a first aspect, the present invention provides a system for measuring a radiation dose received by a patient, in real-time, in-vivo and at multiple locations along part of the length of a light guide. The system comprises
a) a light guide, preferably a minimally invasive light guide, which under the influence of ionizing radiation undergoes measurable and quantifiable physical changes. The light guide is coated, over at least part of its length, with a coating comprising a first component, e.g. a first (internal) coating, acting as a place dependent spectral filter, and a second component, e.g. second (external) coating, including at least one luminescent material, dispersed in a transparent matrix. Alternatively, rather than being two separate layers, the first and the second components may be mixed in a single layer;
b) a detector system which allows the recording and quantification of the signal emitted by the light guide. The detector system may measure the spectral content of the signal carried by the light guide. The total signal may then be mathematically decomposed in location specific components, each giving the dose at that specific location along the light guide; and
c) a control unit which is adapted for calculating a dose of ionizing radiation previously or simultaneously received by the light guide, on basis of said response signal. The control unit can reconstruct doses at different locations along the light guide, starting from the total signal carried by the light guide.

It is an advantage of embodiments of the present invention that efficient systems and methods are provided for the design of an integrated disposable smart dosimetric probe based on a light guide which allows a spatial distributed measurement, in-vivo and in real-time, of the dose absorbed by a patient exposed to radiation.

In embodiments of the present invention, the light guide may be an optical fiber.

In a system according to embodiments of the present invention, the light guide may be coated with the coating comprising the first and second components, e.g. with a double layer coating, at a discrete number of locations along its length, for example at two locations.

In embodiments of the present invention, the luminescent material integrated in the coating, for example in the second (external) coating, may be selected among $Al_2O_3$, $BaF_2$, NaI, $CaF_2$ and BGO (barium germanate). Any of these materials can be used in doped or un-doped form.

In a system according to embodiments of the present invention, the first component, e.g. the first (internal) coating, acting a s filter is adapted for operating in the visible part of the electromagnetic spectrum (i.e. from 400 nm to 700 nm). Alternatively, the first component, e.g. the first (internal) coating, is adapted for operating outside the visible part of the electromagnetic spectrum, i.e. below 400 nm or above 700 nm. In particular embodiments of the present invention, the first component, e.g. the first (internal) coating, is adapted for operating from the ultraviolet to the infrared part of the electromagnetic spectrum.

In a system according to embodiments of the present invention, the light guide (for instance an optical fiber) may be shaped in such a way that a 2D surface may be sampled. In this way a 2D dose measurement can be obtained using a single light guide. The light guide can be integrated in a flexible pad, e.g. in the form of an adhesive patch to be put on the skin.

In a system according to embodiments of the present invention, the first and second components may be merged into one single layer. Alternatively, the first and the second components may each be provided in a separate coating layer, both coating layers together forming a double coating.

In a system according to embodiments of the present invention, the control unit may comprise a data management module, for instance for storage of data, and a communication module, for instance for communication with a hospital network to share or retrieve data related to a patient and/or a current procedure or treatment, or for communication to a data storage device. Both modules may possibly be integrated in a single module.

In a system for measuring a radiation dose received by a patient, according to embodiments of the present invention, the detector system may be adapted for measuring the spectral content of the signal carried by the light guide. The total signal obtained may be mathematically decomposed in location specific components, each giving the dose at that specific location along the light guide. The location specific components are mathematically defined through characteristic functions (base functions) H(x), where x defines a particular location on the light guide. The characteristic functions may be obtained in standard calibration conditions.

The total signal D carried by the light guide may be represented as a weighted combination of the characteristic functions:

$$D = \sum_{i=1}^{N} w_i H(x)_i$$

The dose at the different locations ($w_i$) may be calculated by the control unit either by algebraic inversion of the expression given above, or by using an optimization approach, such as, for instance, least square optimization. In the last case the optimization will for instance minimize the following distance:

$$\|D - w_i H(x)_i\|$$

In a second aspect, the present invention provides the use of a system according to embodiments of the present invention for determining an amount of radiation received by a defined part of the body, in real-time. It is an advantage that this way, the radiation dose can be determined in a minimally invasive way.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, in which.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, directional terminology such as top, bottom, front, back, leading, trailing, under, over and the like in the description and the claims is used for descriptive purposes with reference to the orientation of the drawings being described, and not necessarily for describing relative positions. Because components of embodiments of the present invention can be positioned in a number of different orientations, the directional terminology is used for purposes of illustration only, and is in no way intended to be limiting, unless otherwise indicated. It is, hence, to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

Definitions

With "radiation dose" in the context of the present invention is meant a dose of ionizing irradiation, received by a pre-determined body part, e.g. a pre-determined part of the body, such as a body of a human or animal subject, during a radiotherapy treatment, e.g. during radiotherapy. For example the pre-determined body part may comprise a tissue volume corresponding to an irradiation target volume in an irradiation treatment plan specifically drawn up for the human or animal subject.

"Luminescent materials" are materials that absorb energy from an external source different from a heat source, e.g. impinging ionizing radiation, and as a consequence thereof emit light.

With "dosimetric probe" in the context of the present invention is meant a light guide, such as for instance an optical fibre, coated over at least part of its length with a coating comprising a first component acting as a place dependent spectral filter and a second component including at least one luminescent material. The first and the second components may be integrated in a single coating layer, or they may be provided in separate coating layers, both layers together forming a double coating layer. The light guide forms the core of the dosimetric probe.

Figure 6:
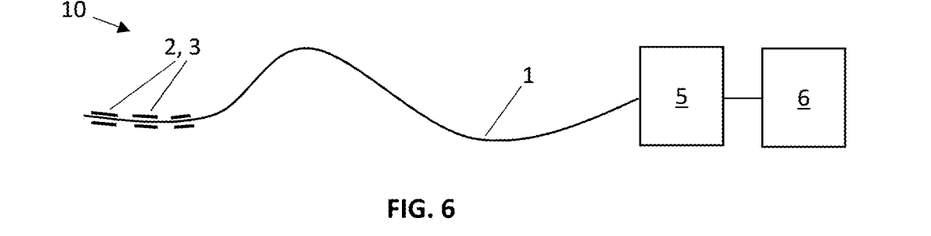
FIG. 6 schematically illustrates a system for measuring a radiation dose, in accordance with embodiments of the present invention.

In a first embodiment, as illustrated in FIG. 6, the present invention provides a system 10 for measuring a radiation dose received by a patient, in real-time, in-vivo and at different locations along the length of a light guide. The system 10 comprises:
a) a light guide 1, which under the influence of ionizing radiation undergoes measurable and quantifiable physical changes; wherein the light guide 1 is coated, over at least part of its length, with a coating comprising a first component 2 acting as a place dependent spectral filter and a second component 3 including at least one luminescent material, dispersed in a transparent matrix;
b) a detector system 5 which allows the recording and quantification of the luminescent signal emitted or transported by the light guide 1; and
c) a control unit 6 which is adapted for calculating a dose of ionizing radiation previously or simultaneously received by the light guide 6 on basis of said response signal. The calculation of the doze of ionizing radiation may be performed on-line (i.e. during radiation) or off-line (i.e. after a radiation step has been performed).

Figure 1:
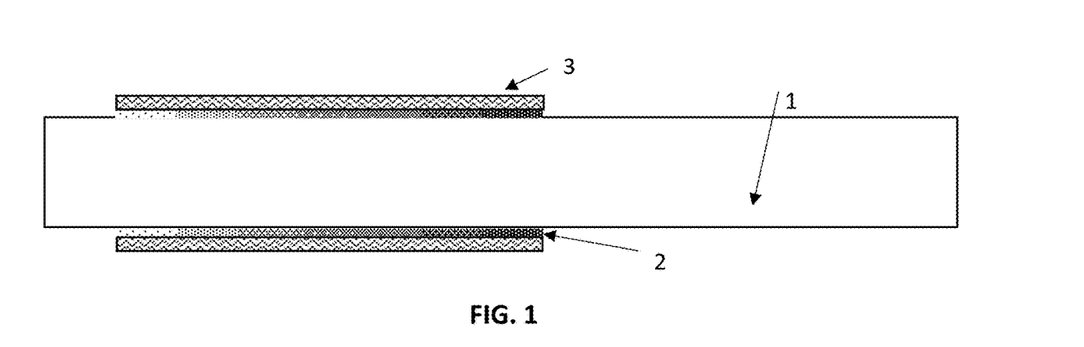
FIG. 1 illustrates a light guide coated over part of its length, in a continuous region, with a double layer comprising a first coating acting as a place dependent spectral filter and a second coating including at least one luminescent material, for use in a measurement system according to embodiments of the present invention.

In embodiments of the present invention, the light guide consists of an optical fiber 1 as illustrated in FIG. 1, coated over a given portion of its length with a double layer comprising a first coating 2 (internal layer) acting as a place dependent filter and a second coating 3 (external layer) including at least one luminescent material, dispersed in a transparent matrix. In alternative embodiments, the optical fiber 1 is coated with a first component acting as a place dependent filter and a second component including at least one luminescent material, dispersed in a transparent matrix, wherein the first and the second components are integrated in a single coating layer provided over a predetermined portion of the length of the optical fibre 1.

Figure 2:
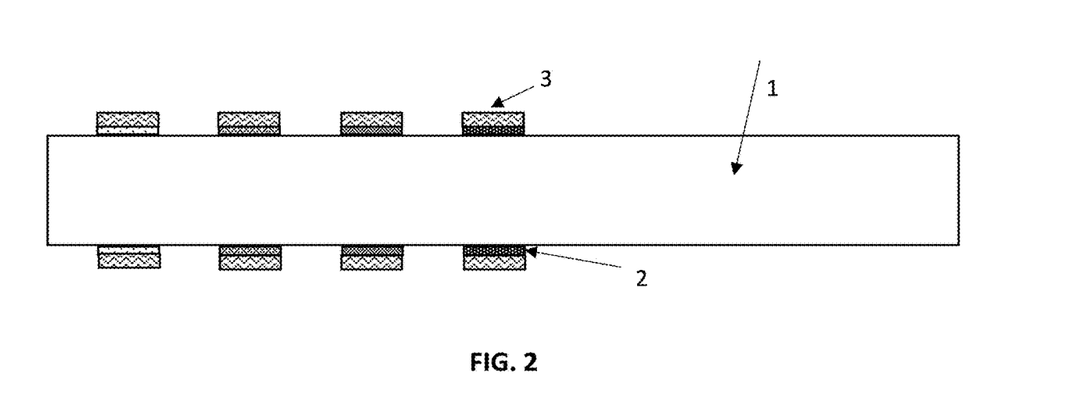
FIG. 2 illustrates a light guide coated over part of its length, in a plurality of distinct zones, with a double layer comprising a first coating acting as a place dependent spectral filter and a second coating including at least one luminescent material, for use in a measurement system according to embodiments of the present invention.

In an alternative embodiment of the present invention, as illustrated in FIG. 2, the optical fibre 1 is not coated with the first and second components, for example in the form of the double layer 2, 3, or intermixed in a single coating layer, over a continuous portion of its length, but rather over a plurality of discrete portions.

When exposed to radiation, the second component, e.g. the luminescent layer 3, be it a continuous layer or a layer comprising a plurality of discrete fields, will emit light with a spectrum depending on the chosen material(s). The amount of light is proportional to the locally imparted dose. The thus generated light will then be filtered, in a location specific way, by the first component, e.g. the inner coating 2, of optical fiber 1.

The location specific filtering by the first component, e.g. first coating 2, is mathematically defined through a characteristic function H(x), where x defines a particular segment on the optical fiber 1. These characteristic functions are defined during standard calibration conditions.

If the total dose of ionizing radiation measured by a system 10 according to embodiments of the present invention is called D, this total measured dose D will be a superposition of the doses measured at each segment of the coated light guide 1. This can be expressed as a weighted sum of these different contributions, so that the following is obtained:

$$D = \sum_{i=1}^{N} w_i H(x)_i$$

In the previous equation, where assuming that the coating comprising the first and second components, e.g. the double coating 2, 3, on the light guide 1 is partitioned into N segments, i represents a specific segment of the light guide, $H(x)_I$ is a matrix that represents the characteristic filtering responses at segments i (each row of the matrix is related to a particular segment i, whereas the columns correspond to the different frequencies in the electromagnetic spectrum) and $w_i$ is the dose recorded at that segment. The latter ($w_i$)

is a vector that can be calculated either by inverting the previous equation (in case matrix H is invertible) or by using an optimization approach. In the mathematical case where the number of segments N becomes very high (infinite to the limit), a spatially continuous dose measurement is obtained along the length of the light guide 1 provided with coating comprising the first and second components, e.g. the double coating 2, 3.

Figure 3:
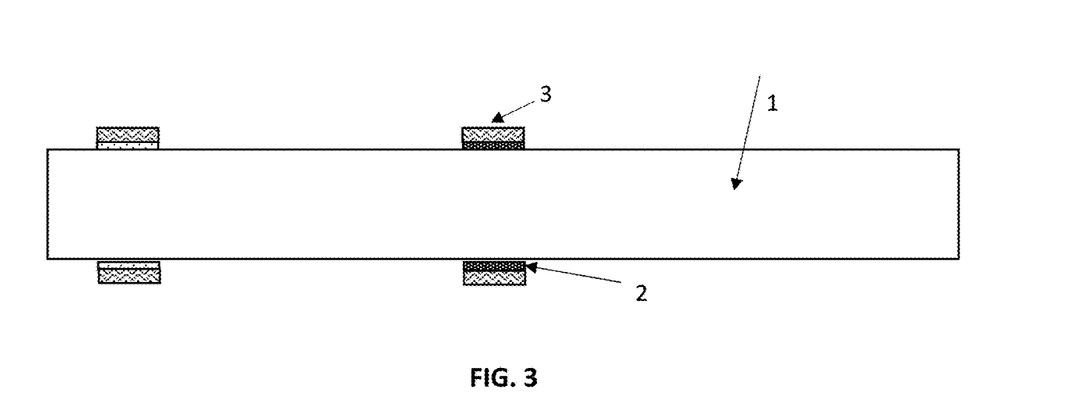
FIG. 3 illustrates a light guide coated in two distinct zones with a double layer comprising a first coating acting as a place dependent spectral filter and a second coating including at least one luminescent material, for use in a measurement system according to embodiments of the present invention.

In a preferred embodiment, as illustrated in FIG. 3, the coating comprising the first and second components, e.g. the double coating 2, 3, is placed at only two locations so that (point) measurements in two organs can be obtained simultaneously. This configuration can for instance be used in interventional procedures to measure at the same time radiation dose in the heart and in the lungs.

In a specific embodiment, the light guide 1 (for instance an optical fiber) is shaped in such a way that a 2D surface may be sampled. In this way a 2D dose measurement can be obtained using a single light guide 1. The light guide 1 can be integrated in a flexible pad (not illustrated), e.g. in the form of an adhesive patch for being put on the skin.

In particular embodiments, the two components are merged in one single coating layer where the luminescent material (second component) and the filter material (first component) are dispersed in one single coating matrix.

In embodiments of the present invention, the luminescent material integrated in the coating is selected among (but not limited to): $Al_2O_3$, $BaF_2$, NaI, $CaF_2$, BGO (barium germanate) and alike. These materials can be used in doped or un-doped form.

The luminescent materials may be composed of nano or microparticles, dispersed in a non-absorbing matrix. This matrix is needed to coat the particles onto the optical light guide 1. The matrix needs therefore to be transparent (i.e. non-absorbing) with respect to the light emitted by the luminescent material.

The filter can be composed of a color pigment in a matrix coated onto the optical light guide 1. One example of matrix wherein the pigments can be dispersed are polyvinyl alcohol (PVA) or acrylate based polymer in general, although this is in no way limitative for the present invention.

Colored filters can be obtained by adding specific pigments to the matrix, such as (without being limitative): cerium yellow, cobalt red, copper blue or copper green. Different colors will then be used at different locations, to allow spatial encoding of the signal. The absorption spectra of the filters may partially overlap.

In a preferred embodiment, the first component, e.g. inner coating 2, (filter) may operate in the visible part of the electromagnetic spectrum (i.e. from 400 nm to 700 nm). In another embodiment, the first component, e.g. inner coating 2, (filter) may operate below (<400 nm) or above (>700 nm) the visible part of the electromagnetic spectrum. In yet another embodiment, the first component, e.g. inner coating 2, (filter) may operate from the ultraviolet to the infrared part of the electromagnetic spectrum.

In a specific embodiment, the smart dosimetric probe according to embodiments of the present invention, i.e. the light guide 1 coated with the first and second components, for instance intermixed in a single coating layer or under the form of a double layer 2, 3, over at least part of its length, can be used along with a microtube, such as a needle or a catheter, to guide the dosimetric probe to or in the neighborhood of a piece of tissue to be irradiated by ionizing radiation. This microtube can be used for in-vivo real-time dose monitoring in interventional procedures or in radiation oncology (in brachytherapy for instance). By "real-time" is meant that the dose is measured on a timescale such that this information can be used to adapt the ongoing procedure.

The control unit 6 may be equipped for calculating a dose of ionizing radiation received at the regions of the probe, which have been coated with luminescent materials. The control unit 6 will capture the response signal (filtered luminescence signal) received or generated by the light guide 1 and transform it into a numerical or graphical dataset which reflects the dose of irradiation received at different locations at the probe, e.g. at different locations within the catheter. To this end, each coated region will send its light signal along the fiber 1. The signals are collected in the detector system 5, for instance by photo-sensors that produce a global light spectrum, where light intensity is measured as a function of wavelength. An algorithm such as any of the algorithms discussed previously, then allows calculation of a dose of ionizing radiation in the detector system 6, for example by converting the spectrum in a line dose distribution.

In an advantageous embodiment, the detector system 5 or the control unit 6 includes components selected to analyze and quantify optical signals, in spectral or in time domain.

In a preferred embodiment, the control unit 6 also has a data storage and/or a communication module. Through such modules, the system can interact with the hospital network and retrieve data related to the current procedure. These data, along with the dosimetric data recorded by the system, can be sent to an external server or cloud.

The invention is further supported by the following examples which are intended to illustrate and not to limit the scope thereof:

Example 1: Breast Brachytherapy

In this first example, a patient is considered undergoing a brachytherapy treatment for breast cancer. More specifically, high dose rate (HDR) brachytherapy is considered. In this kind of treatment, guiding needles are first inserted in the breast, across the tumor. Subsequently, radioactive Ir-192 sources are inserted in the guiding needles, for a given time and at a given position, so that the expected (i.e. calculated) dose distribution in and around the tumor is obtained. This procedure is repeated twice a day, for 5 days. Typically, a total dose of 50 Gy is delivered to the tumor over the entire procedure.

Based on the above description of the treatment, it is clear that the kinematic of each Ir-192 source (i.e. its position as a function of the time), along with its activity (defined as the number of disintegrations per second), is extremely important in order to obtain the expected dose distribution.

In order to monitor on-line and in real-time the dose distribution along a given line crossing the tumor, and to compare it with the dose calculated by the treatment plan, one of the guiding needles was used to insert a measurement system according to embodiments of the present invention. The probe (coated light guide) was built in such a way that a dose could be measured at five contiguous locations. The filtering coating was composed of a PVA film wherein five different pigments were dispersed, in correspondence with the five measurement locations. The second coating (dosimetric coating) was based on CsI(Tl) microparticles, also dispersed in a PVA film. CsI(Tl) emits light from about 400 nm up to about 700 nm.

The total scintillation light recorded by the probe was sent to the reader that would calculate one dose per each dosimetric segment on the fiber, using the method illustrated previously.

The dose measured in real-time by the system according to embodiments of the present invention was then compared with the dose calculated by the treatment plan and corrections in the sources kinematic could be implemented in almost real-time, where needed, so that an optimized, even optimal, dose distribution was obtained. This optimization resulted in a maximal dose to the tumor with a minimal dose (as low as possible) to the surrounding healthy breast tissues.

Example 2: Interventional Cardiology

In this second example, a patient is considered having a partial vascular occlusion and undergoing therefore a percutaneous transluminal coronary angioplasty (PTCA or PCI or simply angioplasty).

The procedure started with the insertion of a guiding wire. This was used to assist the insertion of a guiding catheter, through which the procedure was performed. Also, a second (venous) catheter (a Swan-Ganz catheter) was inserted. This catheter was such that, at the same time, the distal part of one lumen was located in the pulmonary artery, while the distal part of a second lumen was in the heart. In this catheter, a measurement system according to embodiments of the present invention was inserted. The probe was built in a way that only two dosimetric segments were present: one segment to monitor the dose to the lung during the procedure and the second one to monitor the dose in the heart. It has in fact been proven that these organs receive respectively 50% and 25% of the total entrance dose, and can, as such suffer complications on the longer term.

The two measurement locations were at a distance of 30 cm from each other. The filtering coating was composed of a PVA film wherein two different pigments were dispersed (one at each location). The luminescent coating was based on a dispersion of $Al_2O_3$ microparticles.

When the imaging beam was on, the luminescent material coating the catheter at the two different segments, started emitting light which was guided, through the optical fiber, to the detector system. The detector system recorded the light spectrum received by the fiber and eventually the control unit calculated the dose at the two segments, using the method illustrated previously. This gave the interventional cardiologist a real-time way of monitoring the dose at the critical organs, in a minimally invasive way. On the longer term, this real-time monitoring is intended to lead to an optimization of the procedure and, more specifically, of the use of ionizing radiation, as strongly suggested by the ALARA principle (irradiation should be kept As Low As Reasonably Achievable). This will result in a minimization of the dose for the patient as well as for the practitioner.

Example 3: Detection of Light from an External Light Source

In this experiment, a two point detectors fiber was built. Each detection segment had a length of about 2 cm. A filter coating was brought onto the fiber by painting it with two different tonalities of blue paint, at the two locations. The light blue tonality was first diluted with PVA polymer mixed with methyl alcohol. These paints were purchased at a local shop.

In order to perform the experiment, the fiber was fixed on a table with tape. The lamp, used as source of photons, was also positioned at a fixed distance, with respect to the fiber.

Figure 4:
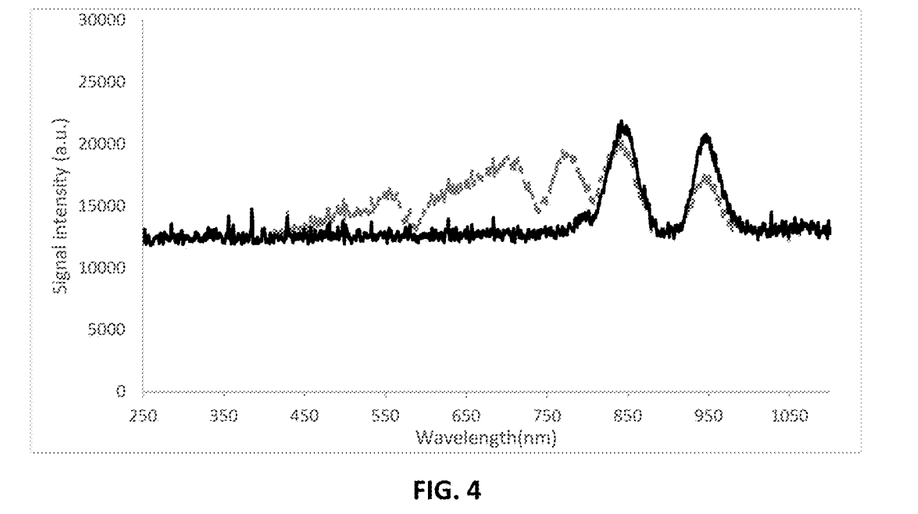
FIG. 4 illustrates measurement signals detected by a coated light guide as in FIG. 3 for measurement at two distinct zones.

The response signal of the channels was then measured, independently, using a CCD based spectrometer connected to the fiber through an SMA connector. This was achieved by covering with a thick black felt the channel that had to be switched off. The procedure was repeated for both channels. FIG. 4 gives the signals generated per channel. The channel responses are given by the black and gray lines for the two segments (channels) respectively.

The total response of the fiber was obtained by exposing both channels simultaneously to light.

A fitting algorithm based on least square optimization was used to reconstruct the total measured signal, starting from the individual channels responses.

The first step of the fitting algorithm consisted in data normalization. Also, a noise correction was first applied to both individual channel data. The spectrometer gave in fact a constant noise level for each measurement. When combining both channels linearly, noise would therefore result double as much as the actual value:

$$S_A = H_A * I + O$$

$$S_B = H_B * I + O$$

where $S_A$ and $S_B$ represent respectively the signals at segments A and B, $H_A$ and $H_B$ represent the characteristic functions of channels A and B, I represents the light intensity as sent by the lamp and O is the offset (constant noise) produced by the spectrometer. Therefore, when linearly combining both channels, as done in the fit procedure, the following is obtained:

$$S_{total} = S_A S_B = H_A * I + H_B * I + 2 * O$$

In order to correct for this offset (noise) first half the mean noise value (averaged over the first 100 bins (arbitrary choice) of both channels) needs to be subtracted from the individual responses, before proceeding further to the fitting.

Figure 5:
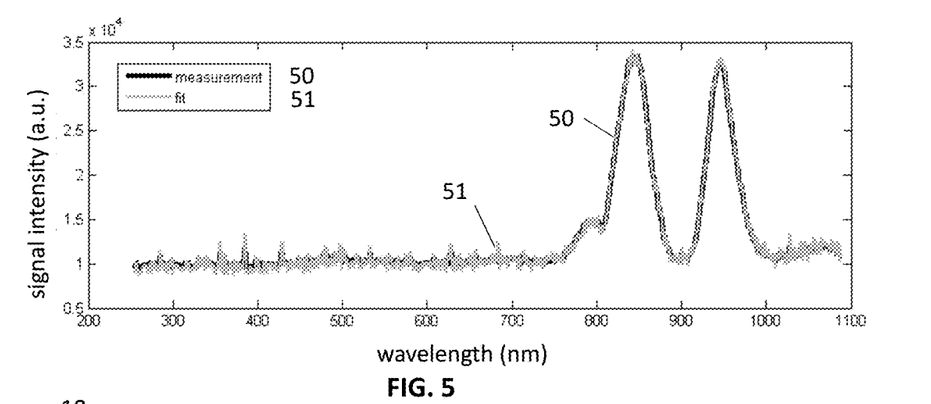
FIG. 5 illustrates measured signals detected by a coated light guide as in FIG. 3 and the fitted total measured response starting from the individual channels.

Finally, a least square normalization algorithm was applied to fit the total measured response, starting from the individual channels. The coefficients calculated represent the light intensity measured at each segment. FIG. 5 shows the result of the fitting: the measured total signal is represented by graph 50 and the fitted curve is represented by graph 51.

The invention claimed is:

1. A system for measuring a radiation dose received by a patient, in real-time, in-vivo and at different locations along a length of a light guide, the system comprising:
   a) a light guide, wherein the light guide is coated, over at least part of its length, with a coating comprising a first component including at least one luminescent material, dispersed in a transparent matrix, for converting received ionizing radiation into a light signal spectrally distributed according to the at least one luminescent material, and a second component acting as a place-dependent spectral filter on the light signal converted by the first component;
   b) a detector system which allows the recording and quantification of the spectrally filtered light signal emitted by the coated light guide at one end thereof; and
   c) a control unit which is adapted for calculating a dose of ionizing radiation previously or simultaneously received by the light guide on the basis of the recorded and quantified spectrally filtered light signal by the detector system.

2. A system according to claim 1, wherein the light guide is an optical fiber.

3. A system according to claim 1, wherein the light guide is coated with the coating comprising the first and second components at a discrete number of locations.

4. A system according to claim 3, wherein the light guide is coated at two locations.

5. A system according to claim 1, wherein the luminescent material included in the first component is selected among $Al_2O_3$, $BaF_2$, NaI, $CaF_2$ and BGO (barium germanate).

6. A system according to claim 1, wherein the second component is adapted for operating in the visible part of the electromagnetic spectrum.

7. A system according to claim 1, wherein the second component is adapted for operating outside the visible part of the electromagnetic spectrum.

8. A system according to claim 1, wherein the second component is adapted for operating from the ultraviolet to the infrared part of the electromagnetic spectrum.

9. A system according to claim 1, wherein the light guide is shaped in such a way that a 2D surface may be sampled.

10. A system according to claim 1, wherein the first and second components are merged into one single layer.

11. A system according to claim 1, wherein the first and second components are each provided in a separate coating layer.

12. A system according to claim 1, wherein the control unit comprises a data management module and a communication module.

13. A system according to claim 1, wherein the detector system is adapted for measuring a spectral content of the light signal emitted by the light guide.

14. A system according to claim 1, wherein the control unit is adapted for calculating a received dose of ionizing radiation at different locations by algebraic inversion of a total signal D emitted by the light guide expressed as a weighted combination of characteristic functions, each giving the dose received at a specific location along the light guide:

$$D = \sum_{i=1}^{N} w_i H(x)_i$$

or by using an optimization approach.

15. A method for determining a dose of radiation received by a pre-defined part of a patient's body, in real-time, the method comprising the steps of:
providing a light guide positioned at least at the pre-defined part of the patient's body, the light guide being coated, over at least part of its length, with a coating comprising a first component including at least one luminescent material, dispersed in a transparent matrix, for converting received ionizing radiation into a light signal spectrally distributed according to the at least one luminescent material, and a second component acting as a place-dependent spectral filter on the light signal converted by the first component;
recording, in response to ionizing radiation, the spectrally filtered light signal of the coated light guide emitted at one end thereof; and
calculating the dose of radiation received by the light guide on the basis of said recorded signal.

* * * * *